United States Patent [19]

Sherman et al.

[11] Patent Number: 4,601,821
[45] Date of Patent: Jul. 22, 1986

[54] FREESTANDING AQUARIUM FILTER

[75] Inventors: Robert M. Sherman, Granada Hills; Charles O. Fuerst, Simi Valley, both of Calif.

[73] Assignee: Aquaria, Inc., Chatsworth, Calif.

[21] Appl. No.: 503,360

[22] Filed: Jun. 10, 1983

[51] Int. Cl.⁴ .............................................. E04H 3/16
[52] U.S. Cl. .................... 210/169; 210/282; 210/416.2; 210/493.1; 210/456; 119/5
[58] Field of Search .................. 210/169, 416.2, 416.4, 210/493.5, 222, 223, 167, 168, 249, 416.1, 418, 420, 416.3, 416.5, 443, 456, 493.1, 282; 119/5; 123/41.55; 417/420

[56] References Cited

U.S. PATENT DOCUMENTS

| | | | |
|---|---|---|---|
| 3,273,717 | 9/1966 | Canterbury | 210/416.2 |
| 3,957,634 | 5/1976 | Orensten et al. | 210/169 |
| 3,981,555 | 6/1975 | Bennett et al. | 210/169 |
| 4,024,064 | 5/1977 | Rakowicz et al. | 210/169 |
| 4,072,616 | 2/1978 | Rohlig | 210/493.5 |
| 4,093,547 | 6/1978 | Sherman et al. | 210/169 |
| 4,108,775 | 8/1978 | Wilkes et al. | 210/169 |
| 4,188,295 | 2/1980 | Burnett | 210/169 |

FOREIGN PATENT DOCUMENTS 1110523 7/1961 Fed. Rep. of Germany .

Primary Examiner—Richard V. Fisher
Assistant Examiner—Wanda L. Millard
Attorney, Agent, or Firm—Spensley Horn Jubas & Lubiz

[57] ABSTRACT

An aquarium filter of the free standing, nesting type is provided with an improved magnetic coupling system to couple a drive motor to the impeller which pumps water through the filter. A ring-shaped magnet is secured to the motor shaft and a second magnet coupled to the impeller and carried within the filter housing is inserted into the space inside the first magnet. The magnets are maintained coplanar and the rotation of the motor is coupled to the pump impeller of the filter in a very efficient fashion.

4 Claims, 4 Drawing Figures

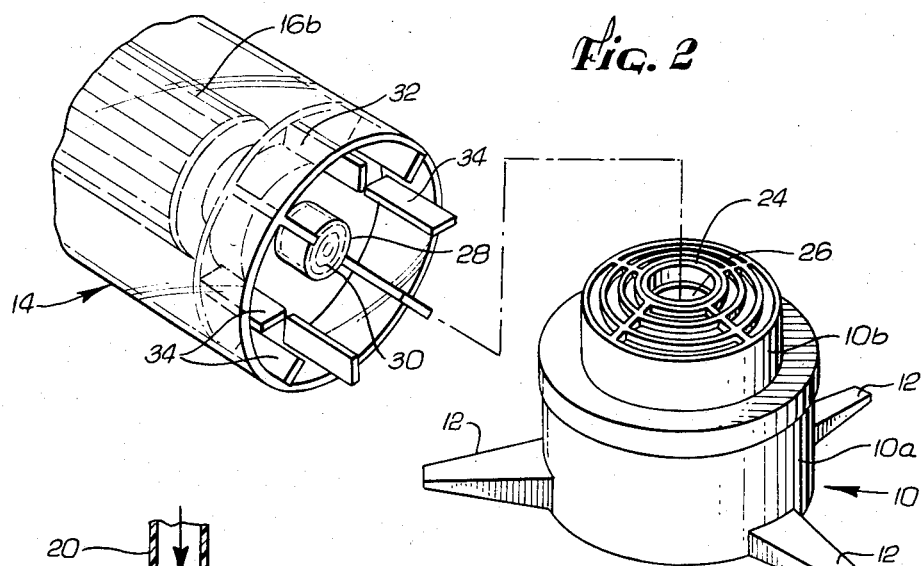
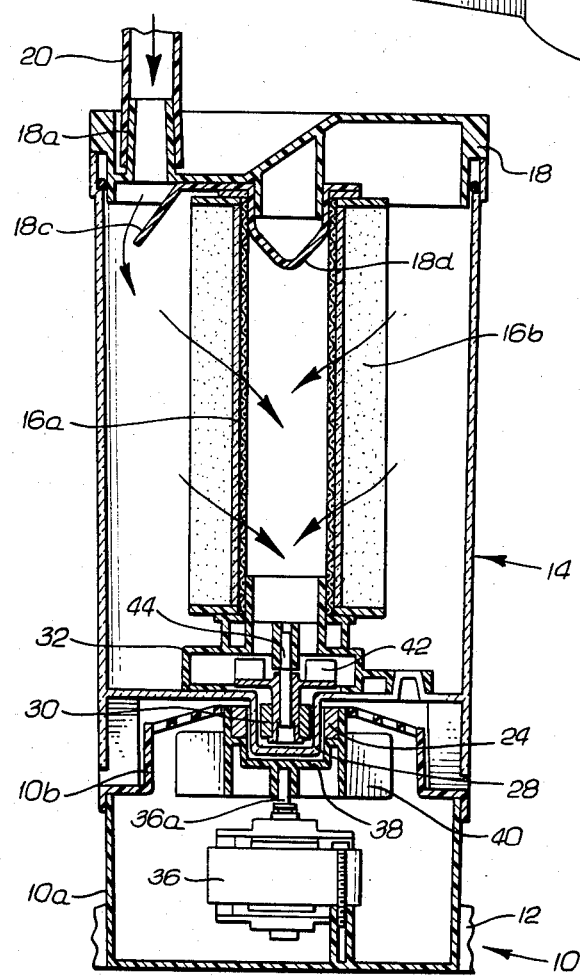

FREESTANDING AQUARIUM FILTER

BACKGROUND OF THE INVENTION

1. Field of the Invention

This invention relates to filters for use with aquariums and more particularly to "free standing" filters, which rest on a surface spaced from the aquarium as opposed to the filters of a type which are attached to the side of the aquarium. Still more particularly, the present invention is directed to an aquarium filter having improved filtering efficiency while maintaining convenient operation.

2. Description of the Prior Art

In order to simplify filter cleaning, aquarium filters of the "nesting" type have been developed in which an upper unit containing a filter cartridge is provided which mates with a lower unit having a motor contained therein. The upper unit contains a pump section having a rotatable impeller which is driven by the motor. The bottom of the upper unit is closed and there is therefore no direct contact between the motor and the impeller. The closed design enables the upper section to be removed for convenient cleaning and filter replacement. In order to drive the impeller, a first disc-shaped magnet is coupled to the motor shaft and a second disc-shaped magnet is coupled to the impeller. The impeller is thereby magnetically coupled to the motor and rotation of the motor shaft results in rotation of the impeller. Systems such as this are shown in U.S. Pat. Nos. 3,273,717 to Canterbury and 4,093,547 to Sherman, et al. Both patents disclose a nesting-type filter. The Canterbury patent is directed to a free standing aquarium, whereas the Sherman, et al. patent is directed to a filter which is attached to the side of an aquarium.

Although the nesting feature of such units provides a great deal of convenience in terms of servicing the aquarium, the inability to directly drive the impeller impairs the efficiency of such filters. As a result, this type of filter generally has not been suitable for heavy duty applications due to its relatively limited ability to pump water at high rates. This lack of drive power has also prevented the use of fine filtering media, such as diatomaceous earth, with such filters, since they are unable to develop the requisite pressures within the filter.

SUMMARY OF THE INVENTION

Accordingly, it is a primary object of the invention to provide a nesting-type filter which has a more efficient coupling between the motor and the impeller used to pump water through the filter. This is accomplished by providing an efficient magnetic drive system incorporating a ring-shaped drive magnet which is attached to the drive motor. The magnet includes a central cylindrical space. The impeller is coupled to a second magnet which extends into an extension in the bottom of the filter housing and has a diameter which is less than the inside diameter of the drive magnet. When the filter housing is placed upon the base unit, the second magnet extends into the space surrounded by the drive magnet. Both magnets include an equal number of poles which align with one another, and rotation of the drive magnet by means of the motor causes the second magnet, and thus the impeller, to be rotated. The nested magnet configuration results in much more efficient coupling of the motor to the impeller as compared to prior art systems. Filtering efficiency is increased, with the result being both that relatively low power, low cost motors may be employed and fine filtering elements can be used.

BRIEF DESCRIPTION OF THE DRAWINGS

The invention will now be described with reference to the accompanying drawings, wherein:

FIG. 2 is a perspective view showing the top of the base section and the bottom of the filter canister;

FIG. 4 is a sectional view taken along lines 4—4 of FIG. 1.

DESCRIPTION OF THE PREFERRED EMBODIMENT

The following description is of the best presently contemplated mode of carrying out the invention. This description is made for the purpose of illustrating the general principles of the invention and is not to be taken in a limiting sense. The scope of the invention is best determined by the appended claims.

Figure 1:
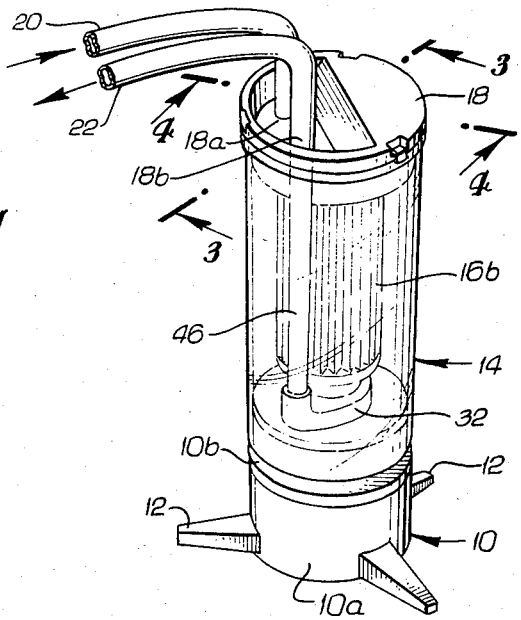
FIG. 1 is a perspective view of the filtering system of the present invention.

Referring to FIG. 1, the filter unit of the present invention includes a base section 10 which is optionally provided with legs 12 for use on surfaces which are relatively unstable, such as carpeting. Sitting on top of the base section is a filter canister 14 having a filter cartridge 16 contained therein. The filter cartridge 16 may be a conventional cartridge formed of a pair of wire mesh screens having carbon granules sandwiched between the screens. Alternatively, because of the efficiency of the system, the filter cartridge may be of a finer type. In the embodiment illustrated, the filter cartridge is a pleated cylindrical cartridge formed of a fibrous material such as that sold under the trademark REEMAY by Dupont Corporation. With this filter element, diatomaceous earth filter material may be used to further increase the filtering action.

The filter cartridge 16 is maintained in position within the canister 14 by means of a removable cover section 18. The cover section includes an inlet port 18a and outlet port 18b to which inlet and outlet tubes 20 and 22 are attached, respectively. The inlet tube 20 provides water from an aquarium to the filter canister, with water being returned to the aquarium via the outlet tube 22.

The filter canister 14 rests upon the base section 10 and may be easily removed. As shown in FIG. 2, the base section 10 includes a stepped housing having a bottom portion 10a and an upper portion 10b. A ring-shaped drive magnet 24 is exposed on the top surface of the section 10b. The drive magnet 24 defines an interior cylindrical space 26. The bottom surface of the canister 14 includes an extension 28 which fits into the space 26 when the canister is placed over the base. The filter canister is preferably made of a transparent plastic material and a magnet 30 and pump housing 32 contained within the canister are visible in FIG. 2. The bottom surface of the canister is recessed and a plurality of vanes 34 are provided to stabilize the canister on the base section 10.

Figure 3:
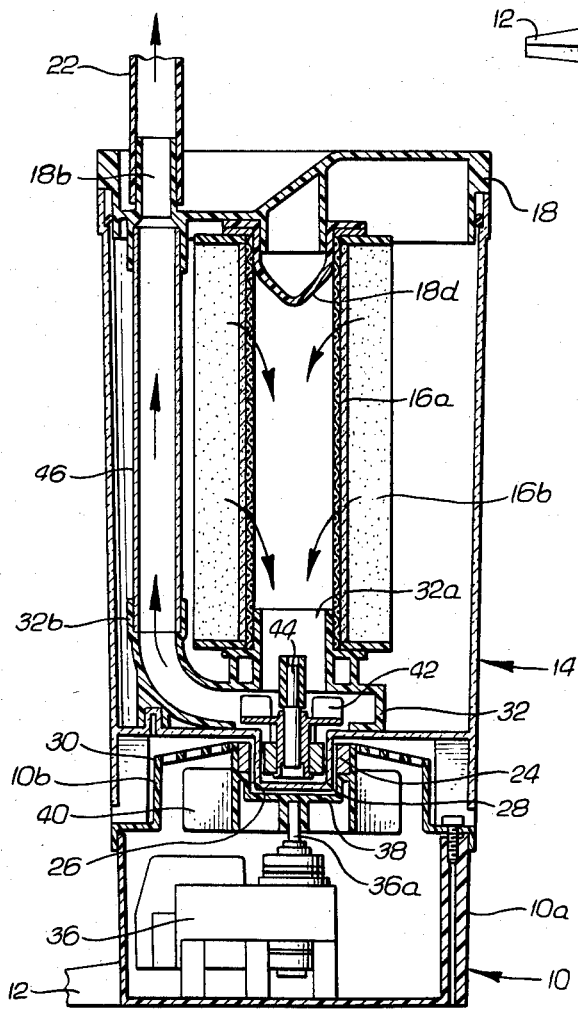
FIG. 3 is a sectional view taken along lines 3—3 of FIG. 1.

Referring now to FIGS. 3 and 4, the motor 36 is located within the base section 10. Attached to the shaft 36a of the motor is a magnet platform 38 to which the magnet 24 is attached. A number of fan blades 40 extend outward from the platform 38 and aid in cooling the motor 36. The platform 38 has a substantially cylindrical configuration, and the extension 28 of the bottom of the canister fits snugly within the opening 26.

The canister 14 carries an impeller 42 within the pump housing 32. The impeller is secured to an impeller shaft 44 which is in turn attached to the housing 32. The magnet 30 which extends into the space defined by the extension 28 is also coupled to the impeller shaft 44, and rotation of the magnet 30 will thus impart rotation to the impeller 42. As can be seen in the drawings, the magnets 24 and 30 are concentric and are coplanar when the canister 14 is positioned in the base 10. The magnet 24 provides a concentrated magnetic field which acts upon the magnet 30. Thus, when the motor rotates the magnet 24, this rotation will be efficiently transferred to the impeller 42 via the magnet 30.

The pump housing 32 includes an inlet port 32a which also serves to position the filter cartridge 16. An outlet port 32b of the pump housing is connected to an exhaust tube 46 which is in turn coupled to the outlet port 18b (FIG. 3). The cover 18 includes a deflection element 18c positioned directly beneath the input port 18a (FIG. 4) in order to deflect incoming water to the wall of the canister in order to prevent the water from directly striking the filter cartridge. The deflection element 18c aids in the uniform operation of the filter cartridge.

The filter cartridge includes a perforated center tube 16a which supports the pleated filter element 16b. The center tube fits over the inlet port 32a of the pump housing. In addition, the cover 18 includes a central extension 18d which fits into the center tube so as to maintain the filter cartridge in position. In operation, water from an aquarium is introduced into the inlet port 18a. A suction effect is created by the rotating impeller 42 and water is drawn through the filter 16 into the inlet port 32a of the pump housing. Water is then pumped by the impeller by the exhaust tube 46 to the outlet port 18b where it is returned to the aquarium via the outlet tube 22.

Thus, the present invention provides a filter which provides the convenience of a nesting arrangement while enabling high efficiency to be achieved. The magnetic coupling between the motor and the impeller is designed to maximize the transfer of energy to the impeller. High flow rates can be achieved with relatively small motors. The design enables fine filter, which require high flow rates, to be employed without the necessity of using expensive motors.

What is claimed is:

1. A free standing canister-type aquarium filter comprising:

a base section having a motor carried therein, said motor including a vertically extending shaft;

a magnet support element secured to the motor shaft, said support element including a cylindrical vertically facing space which is concentric with the shaft;

a ring-shaped first magnet element carried on the support element, said magnet element containing a plurality of magnetic poles arranged in alternating fashion around the cylindrical space;

an open-topped container configured to rest upon the base section, said container having a generally planar bottom surface which includes a cylindrical extension which fits into the cylindrical space surrounded by the first magnet element;

a pump section located within the container, said pump section including an impeller shaft and an impeller rotatably attached thereto which is concentric with the motor shaft, said impeller located in a space directly above the extension in the bottom of the container, said pump section further including a second magnet element which is coupled to the impeller shaft and extends into the extension in the bottom of the container wherein the second magnet element includes a plurality of magnetic poles equal to the number of magnetic poles of the first magnet element and wherein the second magnet element is concentric with the first magnet element and is surrounded thereby, whereby rotation of the first magnet element imparts rotation to the second magnet element and thus the impeller;

a filter section located within the container, said filter section being in fluid communication with the pump section, said filter section including a filter element through which water must pass before entering the pump section, and a cover section having an inlet port coupled to the filter section and an outlet port coupled to the pump section.

2. An aquarium filter according to claim 1 wherein the support element includes a plurality of fan blades extending therefrom to cool the motor.

3. An aquarium filter according to claim 1 wherein the cover section includes an inlet port near the edge thereof and a deflector element on the underside thereof adjacent the inlet port to deflect incoming water toward the sidewall of the container.

4. An aquarium filter according to claim 1 wherein the filter element is a removable filter cartridge having a hollow cylindrical configuration, said cartridge having a pleated surface and adapted for use with a diatomaceous earth or similar filter material.

* * * * *